United States Patent [19]

Hieda

[11] Patent Number: 4,833,538
[45] Date of Patent: May 23, 1989

[54] IMAGE PICKUP APPARATUS FOR PRODUCING AN INHIBITED IMAGE SIGNAL

[75] Inventor: Teruo Hieda, Yokohama, Japan

[73] Assignee: Canon Kabushiki Kaisha, Tokyo, Japan

[21] Appl. No.: 871,561

[22] Filed: Jun. 6, 1986

[30] Foreign Application Priority Data

Jun. 20, 1985 [JP] Japan ................................. 60-134834

[51] Int. Cl.$^4$ ............................................ H04N 5/272
[52] U.S. Cl. .................................... 358/182; 358/183; 358/166
[58] Field of Search ................. 358/182, 183, 22, 160, 358/166, 181

[56] References Cited

U.S. PATENT DOCUMENTS 3,673,324 6/1972 Ito ........................................ 358/182
4,218,711 8/1980 Kashigi ............................... 358/183

Primary Examiner—Tommy P. Chin
Attorney, Agent, or Firm—Fitzpatrick, Cella, Harper & Scinto

[57] ABSTRACT

Disclosed is an image pickup apparatus in which a phase control gradually shifts the phase of an image signal produced from an image pickup relative to the phase of a vertical synchronization signal. An inhibit device is provided to inhibit the portion of the image signal which corresponds to the phase difference relative to the synchronization signal. Thus a special effect of "scrolling" is obtained. A level control is provided to control the signal level of the image signal so that the signal at the input of the inhibit device is maintained at a proper level.

34 Claims, 5 Drawing Sheets

FIG. 1
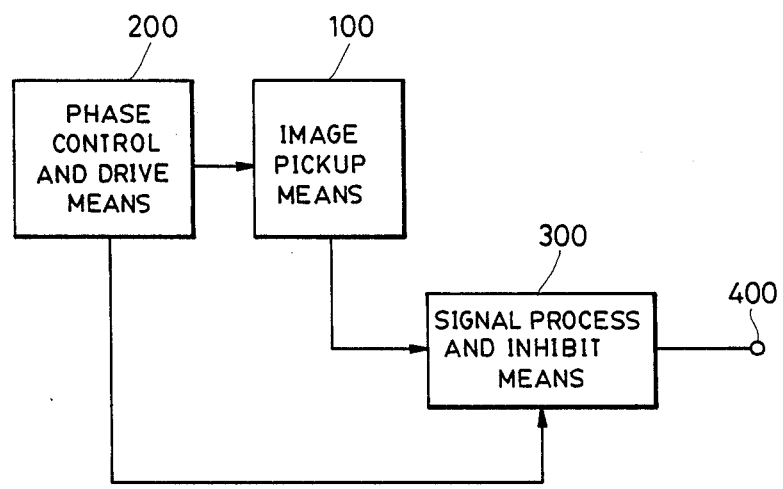
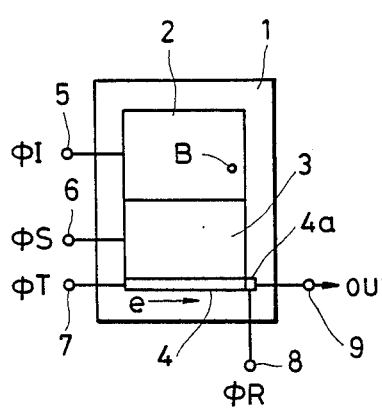
FIG. 2A
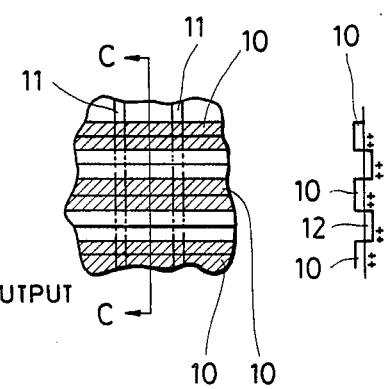
FIG. 2B  FIG. 2C
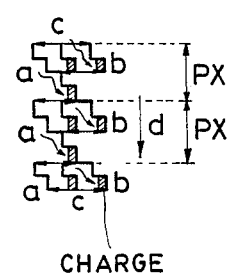
FIG. 2D

IMAGE PICKUP APPARATUS FOR PRODUCING AN INHIBITED IMAGE SIGNAL

BACKGROUND OF THE INVENTION

1. Field of the Invention

This invention relates to an apparatus to pickup an image, and more particularly to such an apparatus which enables one to produce a special effect on picking up the image.

2. Description of the Related Art

In the field of television (TV) display apparatus, there have been proposed many kinds of devices which enable one to produce special effects by controlling a picture on a TV screen. Among these are devices for vertically shifting the picture on the TV screen. In connection with such devices it has been proposed to use a frame memory to memorize the whole signal for one picture, in which the picture signal is once loaded into the memory and is then read out therefrom while gradually changing the read-out timing during repetitive read-out.

With this method, however, the circuit construction becomes complicated; and in addition, the size of the device becomes large due to the necessity of the frame memory.

SUMMARY OF THE INVENTION

According to one aspect of the present invention, there is provided an image pickup apparatus which comprises image pickup means, drive means, circuit means, phase control means, and inhibit means. The image pickup means generates an image signal in response to an optical image. The drive means drives the pickup means to cause the pickup means to output the image signal. The circuit means processes the image signal for a television display, so that the processed image signal includes a synchronization signal for the television display. The phase control means variably controls a phase relationship between the image signal and the synchronization signal; and the inhibit means inhibits the image signal in response to the phase relationship between the image signal and the synchronization signal.

The phase control means can be arranged to vary the phase of the image signal relative to the phase of the synchronization signal. According to a preferred embodiment of the present invention, the phase control means is arranged to gradually or successively shift the phase of the image signal relative to the phase of the synchronization signal. The synchronization signal may be a vertical synchronization signal and the phase control means may be arranged to variably shift the drive timing or phase of the image pickup means relative to the phase of the vertical synchronization signal so that a special effect called "scrolling" or the like can be achieved, in which the picture which is produced by the image signal is moved vertically on the screen to gradually appear or disappear.

The inhibit means may be arranged to inhibit a portion of the image signal which corresponds to the phase difference between the image signal and the synchronization signal. According to a preferred embodiment of the present invention, the inhibit means is arranged to eliminate the portion of the image signal which is shifted in phase relative to the synchronization signal. The inhibit means may preferably include a gate circuit to control the supply of the image signal to the circuit means or to control the output of the circuit means.

By the feature of the above-mentioned aspect of the invention, the image pickup apparatus can easily produce a special effect with a simple construction.

According to another aspect of the present invention, there is provided an image pickup apparatus which comprises image pickup means, drive means, circuit means, phase control means, inhibit means, and level control means. The image pickup means generates an image signal in response to an optical image. The drive means drives the pickup means to cause the pickup means to output the image signal. The circuit means processes the image signal for a television display, so that the processed image signal includes a synchronization signal for the television display. The phase control means variably controls a phase relationship between the image signal and the synchronization signal. The inhibit means inhibits the image signal in response to the phase relationship between the image signal and the synchronization signal; and the level control means controls the signal level of the image signal on the basis of the image signal which is not yet inhibited or processed by the inhibit means.

The phase control means and the inhibit means, in this aspect of the invention may be the same as in the first aspect. On the other hand, the level control means may include a detection circuit and a level control circuit. The detection circuit detects the signal level of the image signal before the processing by the inhibit means. The level control circuit controls the signal level of the image signal on the basis of the signal level detected by the detection circuit. According to a preferred embodiment of the invention, the level control circuit adjusts a diaphragm to control the amount of light falling on the image pickup means in response to the signal level detected by the detection circuit.

By the feature of the above-mentioned aspect, the image pickup apparatus can easily produce a special effect with its simple construction and with a proper signal level of the image signal.

The above and another aspects, features and advantages of the present invention will become apparent from the following detailed description of a preferred embodiment referring to the attached drawings.

BRIEF DESCRIPTION OF THE DRAWINGS

FIG. 1 is a block diagram, showing in general outline an arrangement for an image pickup apparatus according to the present invention;

FIG. 2A is a schematic diagram showing one example of a frame transfer type CCD imager which may be used in its preferred embodiment of FIG. 1;

FIG. 2B is an enlarged view of a portion indicated by B in FIG. 2A;

FIG. 2C is a cross-sectional view taken along line C—C in FIG. 2B;

FIG. 2D is a schematic diagram showing potential distribution in the CCD imager at the time of change transferring;

DETAILED DESCRIPTION OF A PREFERRED EMBODIMENT

Figure 3:
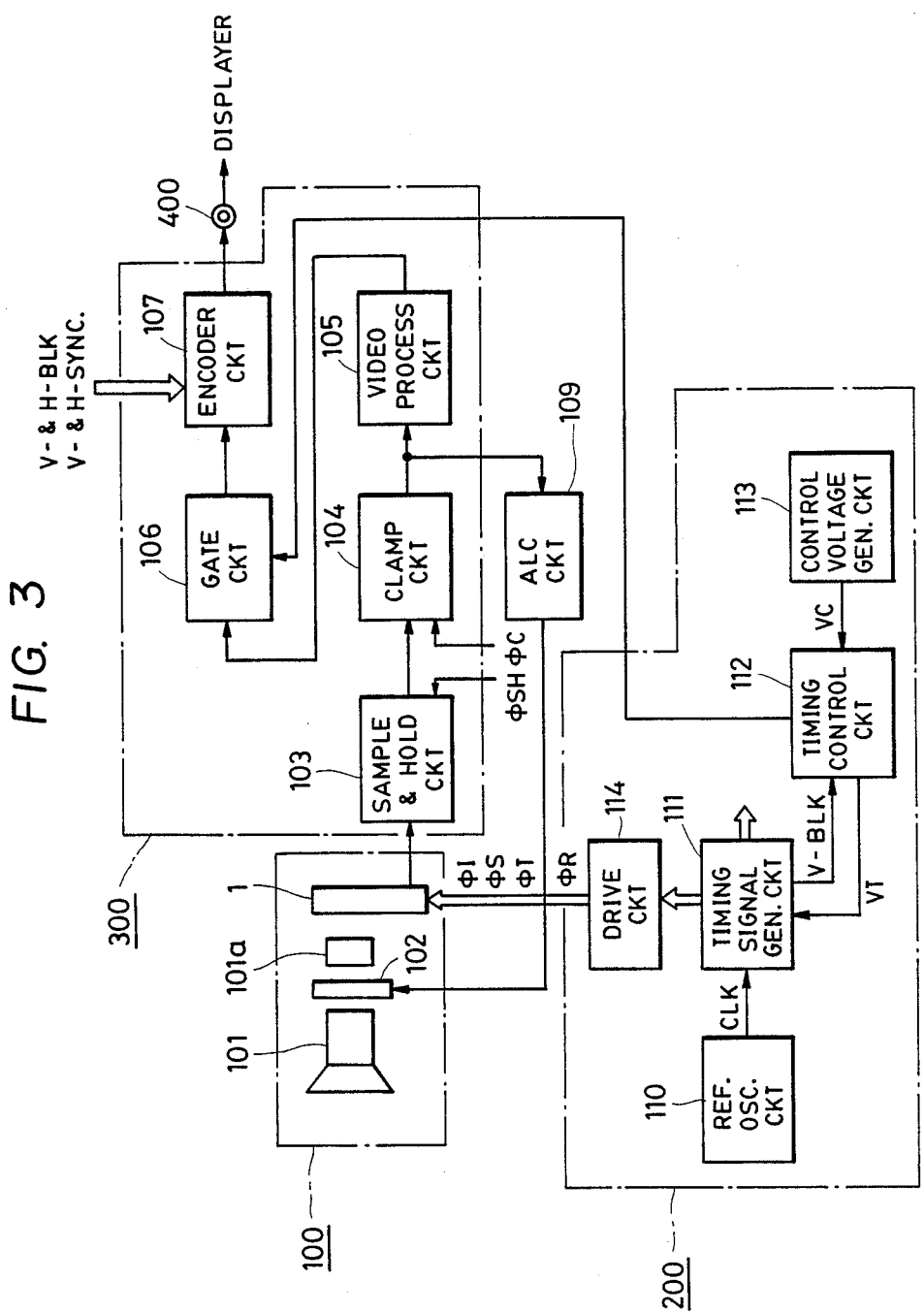
FIG. 3 is a block diagram showing a preferred embodiment of the present invention.

At first, the outline of a preferred embodiment of the present invention will be explained with reference to FIG. 1.

In FIG. 1, image pickup means 100 is provided for generating an image signal in response to an optical image. A CCD imager, an MOS imager, an image pickup tube and the like, can be used as the image pickup means 100. A phase control and drive means 200 is provided for driving the image pickup means 100 to cause the pickup means 100 to produce an output image signal. The output image signal produced by the image pickup means 100 is applied to a signal process and inhibit means 300 which processes the image signal for a television display so that the processed image signal includes a synchronization signal for the television display. The output of the signal process and inhibit means 300 is supplied to a terminal 400, to which a TV displayer may be connected. The phase control and drive means 200 is provided for variably controlling the phase relationship between the image signal and the synchronization signal.

The signal process and inhibit means 300 includes a gate circuit which is responsive to the phase control and drive means 200 for variably inhibiting the image signal.

In the preferred embodiment, the phase control drive means 200 is arranged to gradually shift the drive timing or phase of the pickup means 100 relative to the phase of the vertical synchronization signal so that the phase of the image signal is gradually shifted (i.e. delayed or advanced) relative to the phase of the vertical synchronization signal. On the other hand, the signal process and inhibit means 300 is arranged to inhibit or eliminate a portion of the image signal which corresponds to the phase difference between the image signal and the vertical synchronization signal caused by the phase shift of the image signal by the phase control means. The signal process and inhibit means 300 may be arranged to eliminate the portion of the image signal which is shifted, i.e. delayed or advanced, in phase relative to the vertical synchronization signal. The signal process and inhibit means 300 may preferably include a gate circuit disposed to control the image signal from the signal process circuit means.

With the above-mentioned construction of an image pickup apparatus, it is possible to produce a special effect called "scrolling" or the like in which the picture is moved vertically on the screen to gradually appear or disappear.

It will be noted that although the phase control means is arranged to shift the phase of the image signal relative to the synchronization signal in the preferred embodiment, it can also be arranged to shift the phase of the synchronization signal relative to the image signal, with this same effect.

The present invention is applicable to image pickup apparatus which utilize many kinds of image pickup means such as a CCD imager, an MOS imager, an image pickup tube and the like. However, the following example, which utilizes as the image pickup means a single phase drive-frame transfer type CCD imager, will be explained as the preferred embodiment of the present invention.

FIGS. 2A to 2D show an example of a single phase drive-frame transfer type CCD imager 1 which forms part of the image pickup means 100 of FIG. 1.

In FIG. 2A, the CCD imager 1 comprises an image pickup part 2 for generating and accumulating signal charges in response to an incident image light, a storage part 3 for temporarily storing the signal charge transferred from the pickup part 2 for read-out, a horizontal shift register 4 for reading out the stored charges from the storage part 3 on a line-by-line basis, an output part 4A for converting the charges into corresponding signal voltages on a pixel-by-pixel (i.e. image element-by-image element) basis, an input terminal 5 for an image pickup part drive pulse $\phi I$, an input terminal 6 for a storage part drive pulse $\phi S$, an input terminal 7 for a horizontal shift register drive pulse $\phi T$, an input terminal 8 for an output reset pulse $\phi R$, and an output terminal 9 for the signal voltages.

In FIGS. 2B and 2C, transparent drive electrodes 10 which are formed by poly-silicon or the like, are provided for horizontal (row) arrays of pixels, respectively. Channel stoppers 11 (FIG. 2B) are provided for separating vertical (column) arrays of the pixels from each other. Also, transparent virtual electrodes 12 (FIG. 2C) are provided for the horizontal arrays of the pixels, respectively.

As is shown in FIG. 2D, in each of the portions respectively corresponding to the electrodes 10 and 12 in each pixel PX, a potential step which goes down along an arrow "d" is formed by planting plus (+) ion. When a high voltage is applied to the drive electrodes 10, each portion corresponding to the drive electrode 10 takes, as is shown by "b" in FIG. 2, a potential distribution lower than that of each portion corresponding to the virtual electrode 12. Also when a low voltage is applied to the drive electrode 10, each portion corresponding to the drive electrode 10 takes, as shown by "a" in FIG. 2D, a potential distribution higher than that of each portion corresponding to the virtual electrode 12. Thus, by applying repetitive high and low voltages (drive pulse $\phi I$) to the drive electrodes 10, the charges are transferred along the direction of the arrow "d" toward the storage part 3. At the time of charge accumulation, the voltage level of the drive electrodes 10 is maintained at an intermediate level between the high and the low voltage levels so that each portion corresponding to the drive electrode 10 takes, as is shown by "C" in FIG. 2D, a potential distribution which is equivalent to that of each portion corresponding to the virtual electrode 12.

The storage part 3 and the horizontal shift register 4 also have basically the same construction as described above except that the storage part 3 and the register 4 are shielded from the light and that in the register 4, the potential steps are formed so that the charges are transferred along the direction of an arrow "e" in FIG. 2A, i.e. toward the output part 4a.

The drive electrodes 10 of the pickup part 2, of the storage part 3 and of the register 4 are respectively connected to the input terminals 5, 6 and 7.

When picking up an optical image with the CCD imager 1 having the above described construction, the image pickup part drive pulse φI is maintained at the intermediate voltage level during one field or vertical period of a standard TV system so that the potential distribution shown by "C" in FIG. 2D is formed in each portion corresponding to the drive electrode 10 of the pickup part 2 and the generated charges are accumulated in each down step portion under the corresponding electrodes 10 and 12. Then the charges generated and accumulated at the image pickup part 2 are transferred to the storage part 3 by applying to the drive electrodes 10 of the pickup part 2 and of the storage part 3, synchronized repetitive high and low voltages, which comprise, respectively, the image pickup part drive pulses φI and the storage part drive pulses φS. The charges stored in the storage part 3 are shifted to the register 4 on a line-by line basis with each drive pulse φS, during the following field or vertical period. On the other hand, the charges taken in the register 4 are transferred to the output part 4a and are converted into corresponding voltages on a pixel-by-pixel basis by applying the register drive pulse φT to the register 4 during one horizontal period of the standard TV system. The output reset pulse φR is applied to the output part 4a to clear off each pixel charge.

The above described operation is repeated at the field or vertical period of the standard TV system; and thereby a series of image pick up signals each corresponding to one TV field signal is supplied from the output terminal 9.

Next, a circuit system of the preferred embodiment of the present invention will be described with reference to FIG. 3.

As shown in FIG. 3, the image pickup means 100 includes, in addition to the CCD imager 1, an image forming lens system 101 for forming an optical image of an object. The image pickup means 100 further includes an optical low-pass filter 101a disposed between the lens system 101 and the image pickup part 2 of the CCD imager 1. Also, a diaphragm 102 is disposed between the lens system 101 and the optical filter 101a for adjusting the amount of the image forming light falling upon the image pickup part of the CCD imager 1.

The signal process and inhibit means 300, as shown in FIG. 3, includes a sample and hold circuit 103 connected to the output of the CCD imager 1. The circuit 103 is provided for sampling and holding the output signal of the CCD imager 1 to convert it into a continuous signal. A clamp circuit 104 is connected to the sample and hold circuit 103 and is provided for reproducing the block level of the image signal. A video process circuit 105 of known type is connected to the output of the clamp circuit 104 and is provided for performing γ (gamma) correction, white clip, black clip, etc. The output of the video process circuit 105 is connected via a gate circuit 106 to an encoder circuit 107 which encodes the output signal of the process circuit 105 according to standard TV format by adding vertical and horizontal blanking signals V BLK and H BLK, vertical and horizontal synchronization signals V Sync and H Sync, etc. The output terminal 400 is connected to the output of the encoder circuit 107. The gate circuit 106 is disposed between the process circuit 105 and the encoder circuit 107 to control the transmission of processed video or image signals from the process circuit 105 to the encoder circuit 107. The encoder circuit 107 constitutes the process circuit means for processing the image signal for the TV display so that the processed image signals have a predetermined signal format for the TV display, while the gate circuit 106 constitutes an inhibit means for variably inhibiting the image signal. Although, in the present embodiment, the gate circuit 106 is disposed before the encoder circuit 107 to control the application of the output signals of the process circuit 105 to the encoder circuit 107, the gate circuit 106 can be disposed after or in the encoder circuit 107 to control the output signal of the encoder circuit 107. A TV displayer can be connected to the output terminal 400. As will be appreciated, the signal process and inhibit means 300 includes the sample and hold circuit 103, the clamp circuit 104, the video process circuit 105, the gate circuit 106 and the encoder circuit 107.

An ALC (Automatic Light Control) circuit 109 is connected between the clamp circuit 104 and the diaphragm 102. The ALC circuit is well known type and it includes an averaging or smoothing circuit, a differential amplifier, a diaphragm drive circuit, etc. The ALC circuit 109 is arranged to control the diaphragm 102 on the basis of the average level of the output signal of the clamp circuit 104, that is, before the gate circuit 106; and it constitutes the level control means for controlling the signal level of the image signal.

The phase control and drive means 200 includes a reference oscillation circuit 110 which generates a reference clock signal CLK. The phase control and drive means 200 also includes a timing signal generating circuit 111 which is connected to receive the clock signal CLK from the reference oscillation circuit 110 and which generates, in response to this signal, a sampling pulse φSH for the sample and hold circuit 103, a clamp pulse φC for the clamp circuit 104, the vertical and the horizontal blanking signals V-BLK and H-BLK, and the vertical and the horizontal synchronization signals V-Sync and H-Sync. for the encoder circuit 107, and reference timing pulses for a drive circuit 114 to be described latter. A timing control circuit 112 is connected to receive the vertical blanking signals V-BLK from the timing signal generator 111; and it is further connected to control the drive timing or phase of the CCD imager 1 via the drive circuit 114, and to control the on off timing of the gate circuit 106. A control voltage generating circuit 113 is provided for generating a control voltage VC and is connected to supply this voltage to the timing control circuit 112 to control the timings operation of the timing control circuit 112. Here, the timing signal generating circuit 111, the timing control circuit 112 and the control voltage generating circuit 113 together constitute the phase control means for controlling a phase relationship between the image signal and the synchronization signal.

As mentioned, there is also provided a drive circuit 114 which receives reference timing pulses from the timing signal generating circuit 111. The drive circuit 114, in response to these reference timing pulses, drives the CCD imager 1.

As will be appreciated, the phase control and drive means 200 comprises the reference oscillation circuit 110, the timing signal generating circuit 111, the timing control circuit 112, the control voltage generation circuit 113 and the drive circuit 114.

In the above described construction of the image pickup apparatus, the lens system 101 causes an object image to be formed on the image pickup part 2 of the CCD imager 1 through the diaphragm 102 and the optical filter 101a. In response thereto, the CCD imager 1 generates and accumulates charges representing the thus formed image.

On the other hand, the timing signal generating circuit 111 provides, in response to the reference clock signal CLK, generated by the reference oscillation circuit 110, the reference timing pulses to the drive circuit 114. In response thereto, the drive circuit 114 drives the CCD imager 1 as described above so that the CCD imager 1 produces an output image signal. The image signal from the CCD imager 1 is sampled and held by the sample and hold circuit 103 in response to the sampling pulse SH supplied from the timing signal generating circuit 111. The image signal from the sample and hold circuit 103 is then supplied to the clamp circuit 104 which, in response to the clamp pulse $\phi C$ from the timing signal generating circuit 111, reproduces the image signal black level. The output signal from the clamp circuit 104 is then processed in the video process circuit 105, and is then supplied to the encoder circuit 107 through the gate circuit 106. The encoder circuit 107 encodes the image signal supplied through the gate circuit 106 for the TV display with the vertical and the horizontal blanking signals V-BLK and H-BLK and the vertical and the horizontal synchronization signals V-Sync. and H-Sync. and supplies the thus encoded image signal to the output terminal 400.

The control voltage generating circuit 113 generates the control voltage VC and supplies this control voltage to the timing control circuit 112. The timing control circuit 112 operates in response to the control voltage VC and to the vertical blanking signal V-BLK from the timing signal generating circuit 111 to operate the drive circuit 114 so as to control the timing or phase of the CCD imager 1. Meanwhile the timing signal control circuit 112 supplies a gate control signal SG to the gate circuit 106.

Figures 4, 5A, 5B, 5C, 5D:
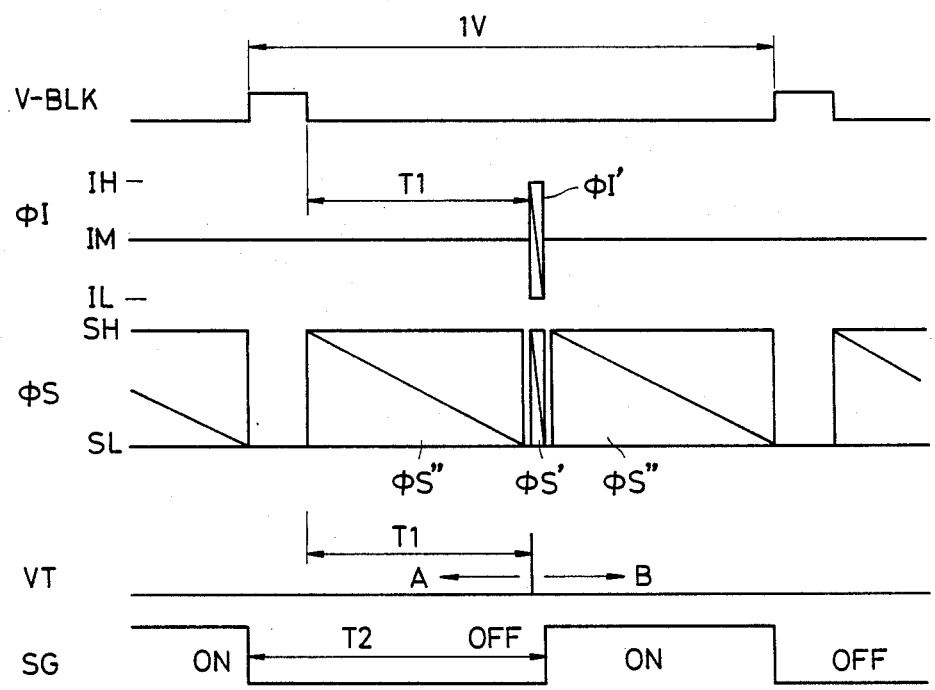
FIG. 4 is a timing chart showing the manner of operation of the apparatus shown in FIG. 3.
FIG. 5A to 5D, 5B' and 5C' are sketches for explaining the special effect on the picture on the TV screen obtained by the preferred embodiment of the present invention shown in FIG. 3.

Referring now to FIG. 4, it will be seen that the drive timing control signal VT (which is produced by the timing control circuit 112 and is supplied to the timing signal generating circuit 111) occurs at the end of a time period $T_1$ following the vertical blanking pulse V-BLK. The time period $T_1$ depends upon the voltage level of the control voltage VC from the control voltage generation circuit 113. In response to the drive timing control signal VT, the timing signal generating circuit 111 supplies the reference timing pulses for the signal read-out to the drive circuit 114; and then drive circuit 114 produces, as the drive pulses $\phi I$ and $\phi S$ rapid vertical charge transfer pulses shown by $\phi I'$ and $\phi S'$ in FIG. 4 to start the signal read-out from the CCD imager 1. The drive circuit 114 then produces, as the drive pulse $\phi S$, a line seguential drive pulse $\phi S''$ to read out the signal as a line-by-line basis. Thus, the signal read-out from the CCD imager 1 is started at a timing of the drive timing control signal VT depending upon the voltage level of the control voltage VC within one field or vertical period IV defined by the vertical blanking signal V-BLK.

The timing control circuit 112 also produces the gate control signal SG which goes to low from high in synchronism with the leading edge of the vertical blanking signal V-BLK, and goes to high from low at the end of the rapid vertical charge transfer pulses $\phi I'$ and $\phi S'$. This gate control signal SG is supplied to the gate circuit 106 which turns on to transmit the image signal when the control signal SG is at its high level, and turns off to inhibit the image signal when the control signal SG is at its low level. Thus, the encoder circuit 107 is inhibited from receiving the image signal during a time period $T_2$ shown in FIG. 4.

It will be noted that, though in the above discussed embodiment the apparatus is arranged so that the picture appears from the bottom, the picture may also appear from the top and it may be erased from the top and from the bottom.

As will be understood from foregoing, the gate control signal, $\phi SG$ in this case, controls the gate circuit 106 so that it eliminates the portion of the image signal which is delayed in phase relative to the vertical synchronization signal V-Sync, or to the vertical blanking signal V-BLK. Accordingly, when the timing of the drive timing control signal VT is gradually shifted from right to left, as shown by an arrow "A" in FIG. 4 within the period IV, the picture on the TV display screen gradually changes from FIG. 5A to FIG. 5B to FIG. 5C to FIG. 5D so that it appears to move up on the screen, that is to give the effect of "scrolling up". On the other hand when the timing of the drive timing control signal VT is gradually shifted from left to right, as shown by an arrow "B" in FIG. 4, within the period IV, the picture on the TV display screen gradually changes from FIG. 5D to FIG. 5C to FIG. 5B to FIG. 5A so that it appears to move down on the screen, that is, to give the effect of "scrolling down".

It will be appreciated that the timing control circuit 112 can readily be modified so that the gate control signal SG makes the gate circuit 106 turn off during the period from the beginning of the rapid vertical charge transfer pulses $\phi I'$ and $\phi S'$ to the trailing edge of the next vertical blanking signal V-BLK. In this case, the gate control signal SG controls the gate circuit 106 so that it eliminates the portion of the image signal which is advanced in phase relative to the vertical synchronization signal V-Sync or the vertical blanking signal V-BLK. Accordingly, if the timing of the control signal VT is gradually shifted along in the direction indicated by the arrow "A", the picture would gradually change from FIG. 5D to FIG. 5C to FIG. 5B to FIG. 5A (i.e. "scrolling up"), while if the timing of the drive timing control signal VT is gradually shifted along in the direction indicated by the arrow "B", the picture would gradually change from FIG. 5A to FIG. 5B to FIG. 5C to FIG. 5D (i.e. "scrolling down").

During the above described image pickup operation, the ALC circuit 109 controls the diaphragm 102 so that a proper signal level is obtained at the output of the clamp circuit 104. Thus, in this embodiment, a proper automatic light control can be maintained during the "scrolling", which is never affected by a deficiency in the image signal.

Figure 6:
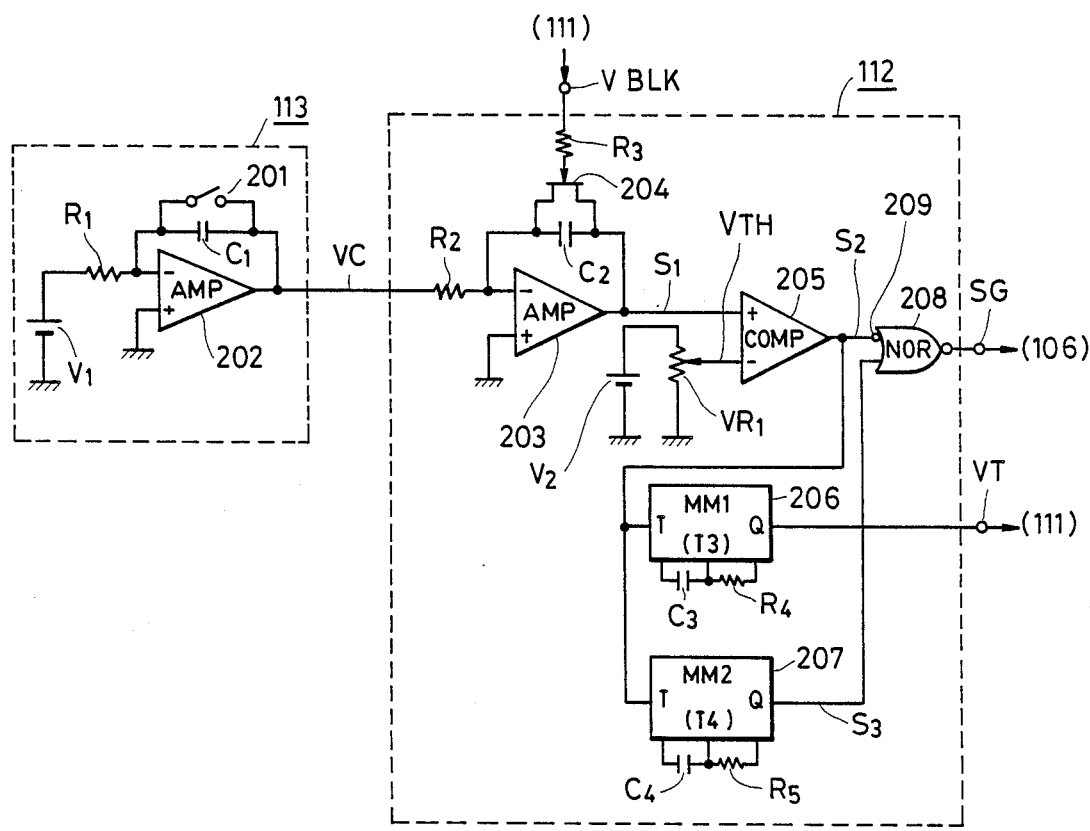
FIG. 6 is a circuit diagram showing examples of the control voltage generating circuit and the timing control circuit shown in FIG. 3.

In FIG. 6, there are shown detailed examples of the control voltage generating circuit 113 and the timing control circuit 112. In these examples, the generating circuit 113 is arranged to generate the control voltage VC which causes the control circuit 112 to gradually shift the timing of the drive timing control signal VT as indicated by the arrow "A" in FIG. 4; and the control circuit 112 is arranged to generate the gate control signal SG which causes the gate circuit 106 to eliminate the portion of the image signal which is delayed in phase relative to the vertical synchronization signal V-Sync. or the vertical blanking signal V-BLK, so that the picture gradually changes from FIG. 5A to FIG. 5B to FIG. 5C to FIG. 5D and appears to move up on the screen ("scrolling up").

In the control voltage generating circuit 113 shown in FIG. 6, there is provided an operational amplifier 202 with a feedback loop which comprises a parallel connection of a capacitor $C_1$ and a switch 201, between the amplifier output and its inversion input. The inversion input of the amplifier 202 is connected to a voltage source $V_1$ through a resistor $R_1$, while the non-inversion input of the amplifier is connected to the circuit ground.

The timing control circuit 112 also includes an operational amplifier 203 with a feedback loop which comprises a parallel connection of a capacitor $C_2$ and an FET (field effect transistor) switch 204, between the amplifier output and its inversion input. The inversion input of the amplifier 203 is connected to the output of the amplifier 202 of the control voltage generating circuit 113) through a resistor $R_1$, while the non-inversion input of the amplifier 203 is connected to the circuit ground. The vertical blanking signal V-BLK is applied through a resistor $R_3$ to the gate of the FET switch 204; and the FET switch 204 turns on in response to the high level of the blanking signal V-BLK. A comparator 205 receives at its non-inversion input, the output $S_1$ of the amplifier 203. Also, the comparator receives, at it inversion input, a predetermined threshold voltage VTH. The threshold VTH is supplied through the series connection of a voltage source $V_2$ and a variable resistor $VR_1$. Mono-stable multi-vibrators 206 and 207 respectively produce high level pulses in response to the rising edge of the output S2 from the comparator 205. The multi-vibrator 206 produces its high level output pulse with a pulse width T3 (FIG. 8) which is determined by a capacitor $C_3$ and a resistor $R_4$ forming part of the multi-vibrator. The multi-vibrator 207 produces its high level output pulse with a pulse width T4 (FIG. 8) which is determined by a capacitor $C_4$ and a resistor $R_5$. A NOR gate 208 receives at one input, the output S3 of the multi-vibrator 207 and at another input, the output of the comparator 205 through an inverter 209. The output of the NOR gate 208 is applied to the gate circuit 106 as the gate control signal SG while the output of the multi-vibrator 206 is applied to the timing signal generating circuit 111 as the drive timing control signal VT.

Figure 7:
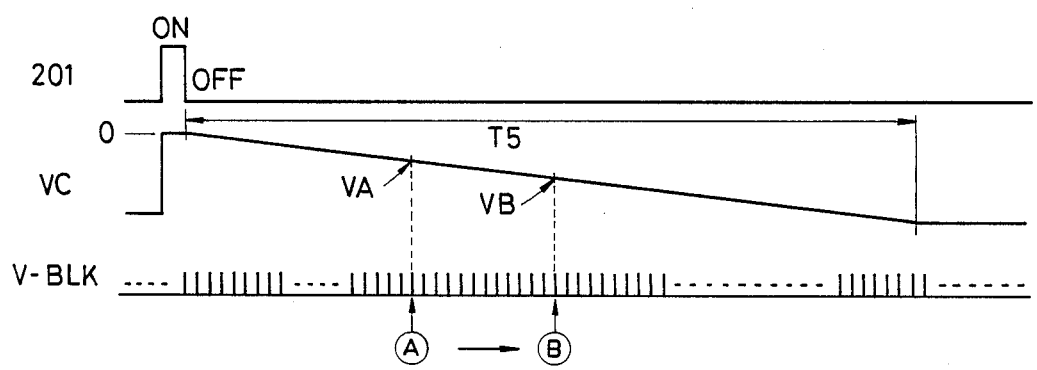
FIG. 7 is a timing chart showing the operation of the control voltage generating circuit shown in FIG. 6.

In operation of the above described construction, when the switch 201 in the control voltage generating circuit 113 is closed, the capacitor $C_1$ discharges through the switch 201 and the output voltage VC of the circuit 113 is reset to zero voltage. Then, when the switch 201 is opened, the capacitor $C_1$ becomes charged at a rate depending upon the voltage of the voltage source $V_1$, the resistance of the resistor $R_1$ and the capacitance of the capacitor $C_1$; and the output voltage VC of the generating circuit 113 gradually decreases (i.e. becomes more negative), as shown in FIG. 7. In this case, the time period T5 from the commencement of the charging of the capacitor $C_1$ until the saturation of the capacitor $C_1$ (or the termination of the charging) is preferably selected from between one and scores of seconds.

Figure 8:
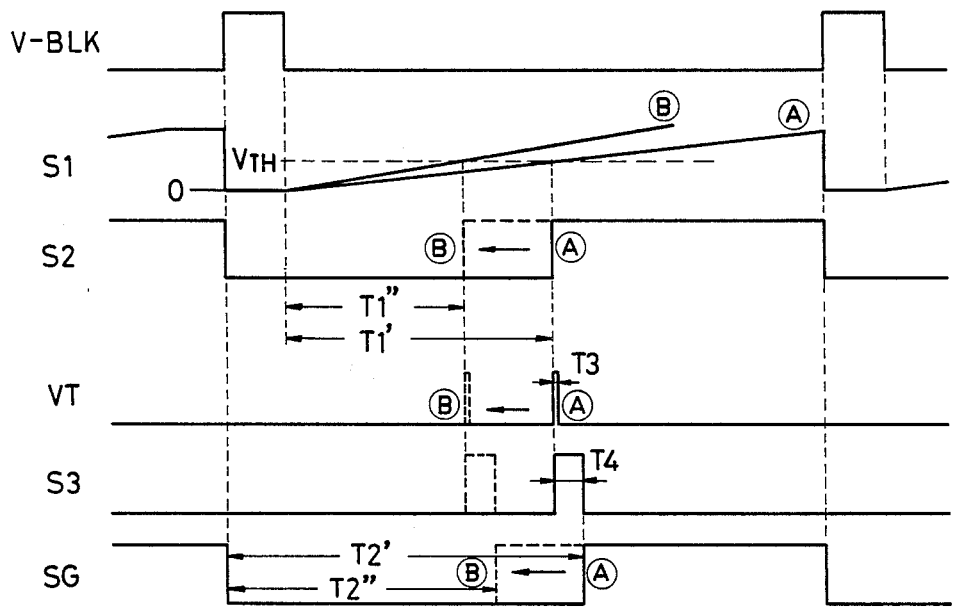
FIG. 8 is a timing chart showing the operation of the image control circuit shown in FIG. 6.

On the other hand, when the high level pulse of the vertical blanking signal V-BLK is applied to the gate of the FET switch 204 in the timing control circuit 112, the FET switch 204 turns on and the capacitor $C_2$ discharges through the FET switch 204; and the output voltage $S_1$ of the amplifier 203 is reset to zero voltage. Then when the FET switch 204 turns off, the capacitor $C_2$ becomes charged at a rate depending upon the voltage level of the control voltage VC generated by the generating circuit 113, the resistance of the resistor $R_2$ and the capacitance of the capacitor $C_2$; and the output voltage $S_1$ of the amplifier 203 gradually increases, (i.e. becomes more positive) as shown in FIG. 8. When the output voltage $S_1$ of the amplifier 203 reaches the threshold VTH, the comparator 205 changes its output S2 from low to high and in response to the rising of the comparator output S2, the multi-vibrators 206 and 207 are triggered and respectively produce single pulses having pulse widths T3 and T4 as shown in FIG. 8. The output of the multi-vibrator 206 is applied to the timing signal generating circuit 111 as the drive timing control signal VT; and, in response to the control signal VT, the generating circuit 111 supplies the reference timing pulse for the signal read-out to the drive circuit 114. Thus, the drive circuit 114 starts the signal read-out from the CCD imager 1.

On the other hand, the output of the NOR gate 208 is made low in response to the low level of the output S2 of the comparator 205; and the output of the NOR gate 208 is made high in response to the falling of the output pulse S3 of the multi-vibrator 207, as shown in FIG. 8. The output signal of the NOR gate 208 is supplied to the gate circuit 106 as the gate control signal SG. Thus, the gate circuit 106 cuts off the image signal during the low level of the control signal SG.

The signals indicated by Ⓐ in FIG. 8 correspond to the voltage level VB of the control voltage VC in FIG. 7 and the signals indicated by Ⓑ correspond to the voltage level VB of the control voltage VC in FIG. 7. Thus, as is shown in FIG. 7, when the control voltage VC reaches a level VA, the signal which is read out from the CCD imager 1 begins after the lapse of the time period $T_1$ from the end of the vertical blanking signal V-BLK; and the supply of the image signal to the encoder circuit 107 is inhibited during the time period $T_2'$. On the other hand, when the voltage level of the control voltage VC reaches VB, the signal which is read out from the CCD imager 1 begins after the lapse of the time period $T_1''$ from the end of the vertical blanking signal V-BLK; and the supply of the image signal to the encoder circuit 107 is inhibited during the time period $T_2''$. Accordingly, the picture on the TV display screen gradually changes from FIG. 5A to FIG. 5B to FIG. 5C to FIG. 5D and appears to move up on the screen and thereby the effect of "scrolling up" is obtained.

Here, the time constant T4 (the pulse width) set at the multi-vibrator 207 is for ensuring that the signal supply to the encoder circuit 107 is commenced after the end of the supply of the rapid vertical charge transfer pulses I' and S' to the CCD imager 1, that is, after the end of the charge transfer from the image pickup part 2 to the storage part 3 in the CCD imager 1.

Lastly, one example of the timing signal generating circuit 111 will be described with reference to FIG. 9.

Figure 9:
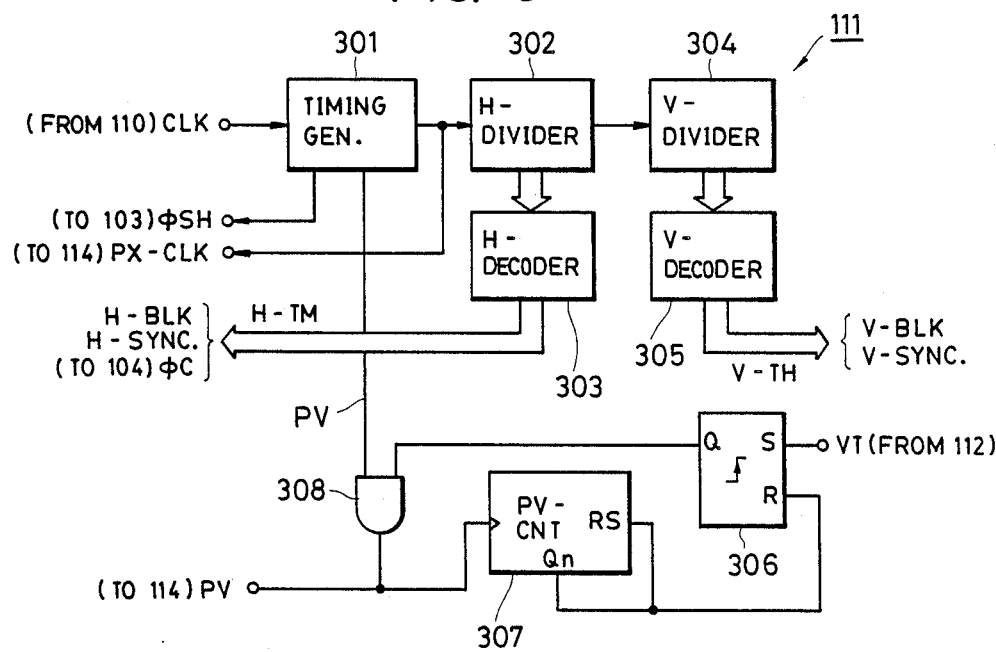
FIG. 9 is a block diagram showing one example of the timing control signal generating circuit shown in FIG. 6.

As shown in FIG. 9, a timing generator 301 is provided for producing, on the basis of the reference clock signal CLK from the reference oscillator circuit 110 (FIG. 3), a pixel output timing clock signal PX-CLK, the sampling pulse S4, and a high frequency reference clock signal PV for rapid vertical charge transferring. A horizontal divider 302 is connected to receive the pixel output timing clock signal PX-CLK from the timing generator 301 and to frequency divide that signal to define a horizontal timing. A horizontal decoder 303 is connected to the output of the horizontal divider 302, to produce, in response thereto, a horizontal timing output H-TM which includes the horizontal blanking signal H-BLK, the horizontal synchronization signal H-Sync. and the clamp pulse C for the clamp circuit 104. A vertical divider 304 is provided for frequency dividing a horizontal reference clock H-CLK produced from the horizontal divider 302 to define a vertical timing. A vertical decoder 305 is provided for producing, on the basis of the output of the vertical divider 304, a vertical timing output V-TM which includes the vertical blanking signal V-BLK and the vertical synchronization signal V-Sync. An RS type flip-flop 306 is connected to be set in response to the leading edge of the drive timing control signal VT from the timing control circuit 112 (FIG. 3) and to be reset in response to the leading edge of the output $Q_n$ of a PV counter 307. The PV counter 307 is provided for counting the high frequency reference clock PV supplied through an AND gate 308. The output $Q_n$ of the counter 307 becomes high when the counter has counted "n" reference clock pulses PV, where the number "n" corresponds to number of rows in the storage cell array in the storage part 3 of the CCD imager 1. The output $Q_n$ of the counter 307 resets the counter 307 as well as the flip-flop 306. The AND gate 308 receives at its one input, the reference clock PV and at its, other input, the output Q of the flip-flop 306. The output PV of the AND gate 308 is supplied to the counter 307 and to the drive circuit 114 (FIG. 3).

In the above described construction, when the reference clock signal CLK is supplied from the reference oscillation circuit 110, the timing generator 301 produces the pixel output timing control signal PX-CLK, the sampling pulse SH and the high frequency reference clock signal PV. The drive circuit 114 produces the register drive pulse $\phi T$ and the reset pulse $\phi R$ on the basis of the timing clock signal PX-CLK, while the sample and hold circuit 103 samples and holds the output signal of the CCD imager 1 in response to the sampling pulse $\phi SH$.

On the other hand, the horizontal divider 302 defines the horizontal timing on the basis of the timing clock signal PX-CLK; and, in response to the output of the horizontal divider 302, the horizontal decoder 303 produces the horizontal timing output H-TM. Included in the output H-TM are the horizontal blanking signal H-BLK, which is supplied to the encoder circuit 107, the horizontal synchronization signal H-Sync., which is supplied to the encoder circuit 107 and to the drive circuit 114, and the clamp pulse $\phi C$, which is supplied to the clamp circuit 104.

The vertical divider 304 defines the vertical timing on the basis of the horizontal reference clock signal H-CLK; and, in response to the output of the vertical divider 304, the vertical decoder 305 produces the vertical timing output V-TM. Included in the output V-TM are the vertical blanking signal V-BLK, which is supplied to the encoder circuit 107 and to the timing control circuit 112 and the vertical synchronization signal V-Sync., which is supplied to the encoder circuit 107.

In this condition, when the drive timing control signal VT is supplied, the flip-flop 306 is set to make its output R high. Accordingly, the AND gate 308 passes therethrough the high frequency reference clock signal PV. In response to the reference clock signal PV, the drive circuit 114 produces the rapid vertical charge transfer pulses $\phi I$ and $\phi S'$. In this manner the signal read-out from the CCD imager 1 is started. On the other hand, the PV counter 307 counts the clock signal PV supplied from the AND gate 308 and causes its output $Q_n$ to become high when it counts "n" clock signals PV. The high output $Q_n$ from the counter 307 in turn resets the flip flop 306. Accordingly, the AND gate 308 inhibits the clock signal PV. Then the drive circuit 114 provides the line sequential drive pulse $\phi S''$ to the CCD imager 1. In this manner the image signal is read out.

As will be understood from the foregoing, the present invention in one aspect makes it possible to easily produce a special effect, such as, so-called "scrolling", with a simple construction. Also by virtue of another aspect, of the present invention, it is possible to maintain the image signal at a proper level during the production of the special effect.

It will be understood that the present invention is not be restricted to the disclosed embodiment; and many modifications would be possible without departing from the scope of the invention, which is defined in the appended claims.

I claim:

1. An image pickup apparatus for producing an inhibited image signal in which a portion of a processed image signal is inhibited, the inhibited image signal corresponding to a partial picture on a television screen, said apparatus comprising:
   (A) image pickup means for generating an image signal in response to an optical image;
   (B) drive means connected to said image pickup means for driving said pickup means to cause the pickup means to output the image signal;
   (C) circuit means connected to said image pickup means and adapted to output the processed image signal to a television display by effecting signal processing in which at least a synchronization signal is added to the image signal output from said image pickup means, the image signal and the synchronization signal each having a phase;
   (D) phase control means connected between said drive means and said circuit means for variably controlling a phase relationship between the image signal and the synchronization signal; and
   (E) inhibit means, connected between said image pickup means and an output of said circuit means, for inhibiting the processed image signal output from said circuit means to said television display in accordance with operation of said phase control means.

2. The apparatus according to claim 1, wherein said phase control means is arranged to vary the phase of the image signal relative to the phase of the synchronization signal.

3. The apparatus according to claim 1, wherein said phase control means is arranged to gradually vary the phase relationship between the image signal and the synchronization signal.

4. The apparatus according to claim 2, wherein said phase control means is arranged to gradually advance the phase of the image signal relative to the phase of the synchronization signal.

5. The apparatus according to claim 2, wherein said phase control means is arranged to vary the phase of the image signal relative to the phase of the synchronization signal to cause a television display area corresponding to the inhibited image signal to disappear upward on said television screen, and to cause a television display area corresponding to an uninhibited portion of the processed image signal to appear from the bottom of said television screen.

6. The apparatus according to claim 2, wherein said phase control means is arranged to vary the phase of the image signal relative to the phases of the synchronization signal to cause a television display area corresponding to the inhibited image signal to disappear upward on said television screen, and to cause a television display area corresponding to an uninhibited portion of the processed image signal to appear form the top of said television screen.

7. The apparatus according to claim 2, wherein said phase control means is arranged to vary the phase of the image signal relative to the phase of the synchronization signal to cause the processed image signal output from said circuit means to correspond to a partial picture which is erased from the top of said television screen.

8. The apparatus according to claim 2, wherein said phase control means is arranged to vary the phase of the image signal relative to the phase of the synchronization signal to cause the processed image signal output from said circuit means to correspond to a partial picture which is erased from the bottom of said television screen.

9. The apparatus according to claim 2, wherein said phase control means is arranged (1) to vary the phase of the image signal relative to the phase of the synchronization signal to cause the processed image signal output from said circuit means to correspond to a picture which is erased from the top of said television screen, and (2) to vary the phase of the image signal relative to the phase of the synchronization signal to cause the processed image signal output from said circuit means to correspond to a picture which is erased from the bottom of said television screen.

10. The apparatus according to claim 1, wherein said inhibit means is arranged to inhibit the outputting of a portion of the processed image signal in a term which corresponds to a phase difference between the phase of the image signal and the phase of synchronization signal, said phase difference being determined by said phase control means.

11. The apparatus according to claim 10, wherein said inhibit means is arranged to eliminate a portion of the processed image signal in the term which corresponds to the phase difference.

12. The apparatus according to claim 10, wherein said inhibit means includes a gate circuit for controlling the output of the processed image signal from said circuit means.

13. The apparatus according to claim 10, wherein said phase control means is arranged to gradually vary the phase difference between the image signal and the synchronization signal.

14. The apparatus according to claim 10, wherein said phase control means is arranged to gradually decrease the phase difference between the image signal and the synchronization signal.

15. The apparatus according to claim 1, wherein said phase control means is arranged to variably control a phase relationship between the timing of the driving of said pickup means by said drive means and the phase of the synchronization signal.

16. The apparatus according to claim 15, wherein said phase control means is arranged to control the timing of the driving of said pickup means by said drive means relative to the phase of the synchronization signal.

17. An image pickup apparatus for producing an inhibited image signal corresponding to a partial picture on a television screen, said apparatus comprising:

(A) image pickup means responsive to an image to generate an image signal;
(B) drive means connected to said image pickup means for driving said pickup means to cause the pickup means to output the image signal;
(C) circuit means connected to said image pickup means and adapted to output a processed image signal to a television display by effecting signal processing in which at least a synchronization signal is added to an image signal output from said image pickup means, the image signal and the synchronization signal each having a phase;
(D) phase control means connected between said drive means and said circuit means for variably controlling a phase relationship between the image signal and the synchronization signal;
(E) inhibit means, connected between said image pickup means and the output of said circuit means, for inhibiting the processed image signal output from said circuit means to said television display in accordance with operation of said phase control means; and
(F) level control means, coupled between said circuit means and said image pickup means, for controlling a signal level of the image signal on the basis of whether the processed image signal is inhibited or uninhibited by said inhibit means.

18. The apparatus according to claim 17, wherein said image pickup means includes an image pickup element and a diaphgram to control an amount of light falling upon said image pickup element, and wherein said level control means includes a detection circuit for detecting the signal level of the image signal which is not yet inhibited by said inhibit means and a control circuit for controlling said diaphgram in response to the signal level detected by said detection circuit.

19. The apparatus according to claim 17, wherein said inhibit means is arranged to inhibit a portion of the processed image signal which corresponds to a phase difference between the phase of the image signal and the phase of the synchronization signal, the phase difference being determined by said phase control means.

20. The apparatus according to claim 19, wherein said inhibit means eliminates the portion of the processed image signal corresponding to the phase difference.

21. The apparatus according to claim 19, wherein said inhibit means includes a gate circuit for controlling the supply of the image signal from said circuit means.

22. The apparatus according to claim 17, wherein said phase control means is arranged to vary the phase of the image signal relative to the phase of the synchronization signal.

23. The apparatus according to claim 22, wherein said phase control means is arranged to control the timing of the driving of said pickup means by said drive means relative to the phase of the synchronization signal.

24. A video camera comprising:
(A) an image forming lens for forming a light image of an object;
(B) an image pickup element arranged to receive the light image to provide a generated image signal;
(C) a drive circuit connected to said image pickup element for driving said pickup element to cause the pickup element to output the generated image signal;
(D) a processing circuit connected to said image pickup element for processing the generated image signal to produce a processed image signal for a television display, said circuit system adding horizontal and vertical synchronization signals to the generated image signal, the generated image signal and the synchronization signals each having a phase;
(E) a phase shift circuit, connected between said drive circuit and said processing circuit, for variably shifting the phase of the generated image signal relative to the phase of the vertical synchronization signal; and
(F) a signal cut-off circuit to cause said processing circuit to cut off a portion of the processed image signal which corresponds to a phase difference between the generated image signal and the vertical synchronization signal.

25. The camera according to claim 24, wherein said phase shift circuit is connected to said drive circuit to variably shift a drive phase of the pickup element relative to the phase of the vertical synchronization signal.

26. The camera according to claim 24, wherein said phase shift circuit is arranged to gradually shift a timing of the driving of the pickup element relative to the phase of the vertical synchronization signal.

27. The camera according to claim 24, wherein said signal cut-off circuit is responsive to the phase shift of the generated image signal by said phase shift circuit and cuts off a portion of the processed image signal which corresponds to the phase shift.

28. The camera according to claim 24, wherein said phase shift circuit and said signal cut-off circuit are arranged to produce an inhibited image signal which corresponds to a partial picture which appears from the top of a television screen.

29. The camera according to claim 24, wherein said phase shift circuit and said signal cut-off circuit are arranged to produce an inhibited image signal which corresponds to a partial picture which appears from the bottom of a television screen.

30. The camera according to claim 24, wherein said phase shift circuit and said signal cut-off circuit are arranged to produce an inhibited image signal which corresponds to a picture which is erased from the bottom of a television screen.

31. The camera according to claim 24, wherein said phase shift circuit and said signal cut-off circuit are arranged to produce an inhibited image signal which corresponds to a picture which is erased from the top of a television screen.

32. The camera according to claim 24, wherein said phase shift circuit and said signal cut-off circuit are arranged to produce an inhibited image signal which corresponds to a picture which is erased from the bottom of a television screen and to produce an inhibited image signal which corresponds to a picture which is erased from the top of a television screen.

33. The camera according to claim 24, further comprising:
a detection circuit, coupled to said processing circuit, for detecting a signal level of the generated image signal before the processing by said cut-off circuit; and
a level control circuit, coupled to said detection circuit, for controlling the signal level of the generated image signal in response to the signal level detected by said detection circuit.

34. The camera according to claim 33, wherein said level control circuit includes a diaphragm to control an amount of light falling upon said pickup element in response to the signal level detected by said detection circuit.

* * * * *